INVENTOR.
ROY M. WILLIAMS, JR.
BY Richard d Seligman
ATTORNEY

INVENTOR.
ROY M. WILLIAMS, JR.
BY Richard I. Seligman
ATTORNEY

INVENTOR.
ROY M. WILLIAMS, JR.
BY Richard L. Seligman
ATTORNEY

United States Patent Office 3,517,252

Patented June 23, 1970

3,517,252

LINEARITY CORRECTION APPARATUS FOR MAGNETICALLY DEFLECTED CATHODE RAY TUBES

Roy M. Williams, Jr., Nashua, N.H., assignor to Sanders Associates, Inc., Nashua, N.H., a corporation of Delaware Filed Feb. 20, 1969, Ser. No. 800,883

Int. Cl. H01j *29/76*

U.S. Cl. 315—24 10 Claims

ABSTRACT OF THE DISCLOSURE

Apparatus is herein disclosed for providing linearity correction for magnetically deflected cathode ray tubes and comprises apparatus for generating a signal whose magnitude is proportional to the radial distance from the center of the CRT to the spot(s) to be displayed and apparatus for attenuating the input voltages (X and Y) proportionally to the generated signal.

Background of the invention

Linearity of a magnetically deflected cathode ray tube (CRT) is a function of the CRT and deflection yoke geometries. If the CRT is assumed to have a perfect gun alignment and the yoke field is assumed uniform, the amount of positional error displayed on a CRT face can be calculated from the known geometries. This error is referred to as "pincushion error." For magnetically deflected CRT's, the pincushion error is zero only for one particular case. This occurs if the deflection center is the same as the center of curvature for the CRT face plate and the resultant image is viewed from an infinite viewpoint. The practical CRT in this case would have a very spherical face and the operator located at an infinite viewpoint would have some difficulty in observing the display. A practical display will have a radius of curvature different from the radius of deflection. Also the operator must view the display from a finite distance. Because of these practical limitations, a magnetically deflected display has pincushion error.

Several methods exist for improving the appearance of the display. Most correction methods do not cure the problem, but tend to make an asthetically pleasing display. To illustrate this form of correction, refer to FIG. 1.

The line AB is the result of an uncorrected line presentation on the CRT face. By use of deflection yoke correction or pincushion correcting magnets, the line may be presented as CD. However, the geometrically correct position is the line EF. The line CD is an asthetically pleasing straight line but since it is positionally incorrect, this type of correction is not suitable for a display that may use overlays or one that is used to obtain accurate positional information.

Some prior art methods of obtaining asthetically pleasing displays, but positionally incorrect, are as follows:

(1) Non-uniform field deflection yokes. However, since the magnetic field is non-uniform, CRT spot resolution is degraded.

(2) Pincushion correction magnets. These may be permanent magnets or electromagnets. The results are similar to those of a non-uniform magnetic field yoke.

(3) Use of reactive components to shape the deflection waveform. This method provides some degree of correction but only of the axis that crosses the CRT center. Also, since the components are time constant dependent, this method is only suitable for constant frequency systems such as television.

Other prior art methods are available that give a positionally correct display, such as:

(1) Use of fiber optics as a CRT faceplate. However, this method is very expensive and has very little flexibility.

(2) Combination waveform correction and pincushion magnet correction. Although, this method has the possibility of giving a positionally correct display, resolution degradation is still present due to the pincushion magnets.

Summary of the invention

Accordingly, it is an object of this invention to provide linearity correction for magnetically deflected cathode ray tubes.

It is another object of this invention to provide pincushion correction which is both asthetically pleasing and positionally correct.

It is a further object of this invention to provide pincushion correction with no CRT spot resolution degradation.

It is yet another object of this invention to provide pincushion correction which is frequency independent.

It is a still further object of this invention to provide pincushion correction in a relatively inexpensive manner.

Briefly, waveform correction with two axis dependence is provided. Frequency independent correction is applied to the deflection waveforms as a function of both vertical and horizontal axis displacements. This correction is a signal having a magnitude proporttional to the radial distance from the center of the CRT screen to the spot(s) defined by the X and Y input voltages.

Brief description of the drawings

The above-mentioned and other features and objects of this invention will become more apparent by reference to the following description taken in conjunction with the accompanying drawings, in which.

Description of preferred embodiments

Prior to discussion of the prefered embodiments of this invention, an analysis of the correction scheme is hereby presented.

The purpose of a linearity correction circuit is to allow a linear input voltage to a deflection system to result in a linear deflection distance on a given CRT. Consider the deflection system block diagram in FIG. 2 where the block G represents the non-linear transfer function of a voltage input (A) to a deflection amplifier which results in a deflected distance output (D) on the CRT screen. The transfer function T will represent the linearity correction transfer function which will yield an overall transfer function GT such that a linear input E will result in a linear output D on the CRT. To formulate a method of linearity correction, an understanding of the factors contributing to non-linearity of Cathode Ray Tubes is required.

Figure 3:
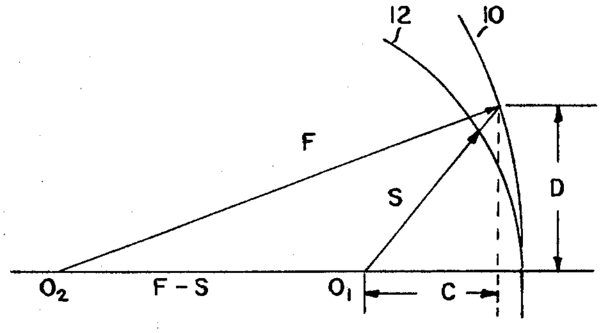
FIG. 3 is a sketch illustrating an actual and ideal CRT.

FIG. 3 is a cross section of a CRT showing the actual screen 10 of radius F and an ideal screen 12 whose radius S is the same as the radius of deflection. The relationship between deflection current (I) and the deflection angle ($\phi$), is given by the equation $$\sin\phi=KI \tag{1}$$

The deflection current is proportional to the input voltage in a linear amplifier design and, a result, it is also proportional to A.

$$\sin\phi=K_1A \tag{2}$$

Trigonomertic analysis of FIG. 3 yields the equation:

$$\sin\phi=\frac{D}{\sqrt{D^2+C^2}} \tag{3}$$

Equating 2 and 3 yields $$\frac{D}{\sqrt{D^2+C^2}}=K_1A$$

or $$\frac{D}{A}=K_1\sqrt{D^2+C^2}$$

where $$\frac{D}{A}=G$$

which is the transfer function of the CRT deflection system. Also, trigonometric analysis yields the equation:

$$C^2=F^2-D^2+(F-S)^2-2(F-S)\sqrt{F^2-D^2}$$

The transfer function may now be written in terms of known parameters.

$$G=K_1\sqrt{F^2+(F-S)^2-2(F-S)\sqrt{F^2-D^2}} \tag{4}$$

where:

G—CRT deflection sytem transfer function from voltage input to deflection distance output.
$K_1$=Proportionality constant relating deflection angle to input voltage. Equation 2.
F=CRT faceplate radius.
S=Ideal concentric screen radius (also deflection radius).
D=Deflected distance of electron beam on CRT screen measured from the center of the faceplate.

Equation 4 may be reduced to a more manageable form if the constant $N=F/S$ is introduced and inserted to yield the following equation:

$$G=SL_1\sqrt{(2N^2-2N+1)-2(N-1)\sqrt{N^2-\left(\frac{D}{S}\right)^2}} \tag{5}$$

Note that when the CRT faceplate radius and the deflection radius are equal ($F=S$) the transfer function reduced to $G'=K_1S$ which is a linear function.

Otherwise, the transfer function G is non-linear and is dependent upon the value of deflected distance D for a given CRT where F and S are constants.

If the transfer function $G'=K_1S$ is considered ideal, a relative distortion equation may be derived.

$$\frac{G}{G'}=\sqrt{2N^2-2N+1-2(N-1)\sqrt{N^2-\left(\frac{D}{S}\right)^2}} \tag{6}$$

In general, the transfer function G is an increasing function as D increases. Realizing this allows the postulation *that any corrective function must have the property of attenuation.*

Figure 1:
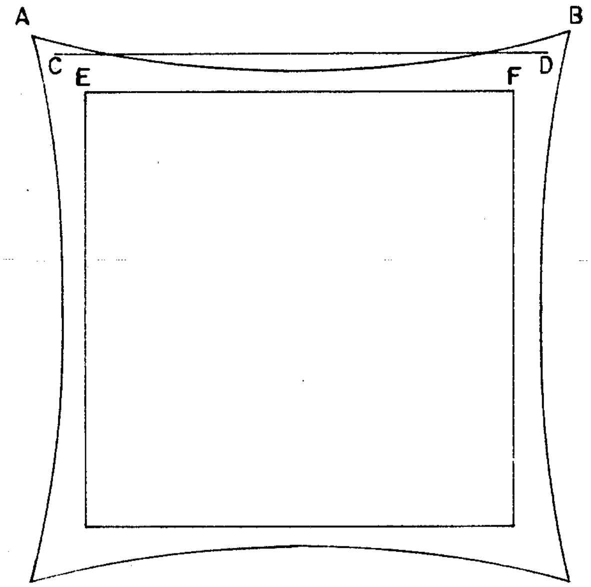
FIG. 1 is a sketch illustrating the problem of pincushion distortion.
Figure 2:
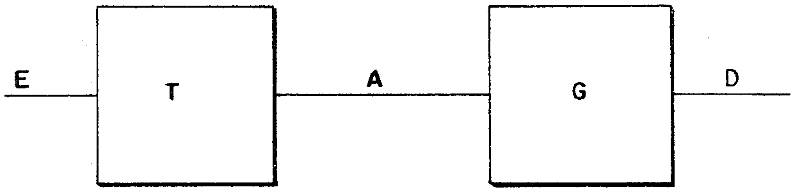
FIG. 2 is a basic block diagram of a deflection system having pincushion error compensation.

Derivation of the transfer function T is aided by FIG. 2 where:

$$T=\frac{A}{E}$$

and $$G=\frac{D}{A}$$

then $$GT=\left(\frac{D}{A}\right)\times\left(\frac{A}{E}\right) \tag{7}$$

$$GT=\frac{D}{E}$$

If GT is ideal and therefore linear as desired $$GT=K_2$$

From Equation 7

$$D=K_2E$$

The transfer function T is found to be inversely proportional to G $$T=\frac{K_2}{G}$$

Equation 5 defines G in terms of the CRT constants and the deflected distance D. It is desired to express G in terms of the normally known linear input E which is done by substituting $K_2E=D$ into Equation 5.

Then T may also be expressed as a function of the input E and the CRT constant F and S (or their ratio $N=F/S$).

$$T=\frac{K_2}{SK_1\sqrt{(2N^2-2N+1)-2(N-1)\sqrt{N^2-(K_2E/S)^2}}} \tag{8}$$

Since the form of the transfer function T is known, it is only necessary to construct a circuit to implement Equation 8. This task proves to be formidable.

Figure 4:
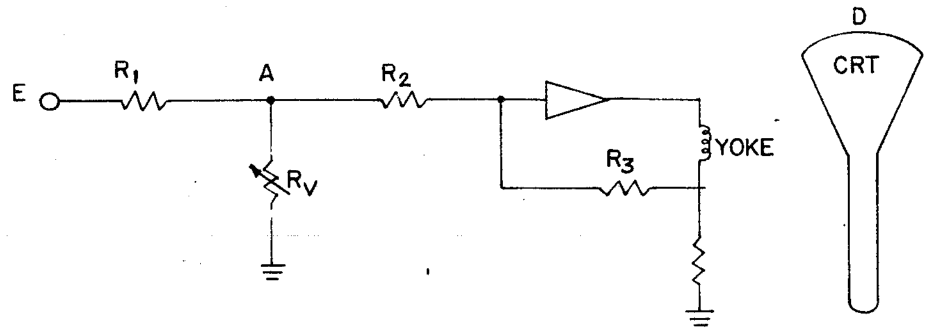
FIG. 4 is a schematic of a linear feedback deflection amplifier.

To perform linearity correction, some form of attenuation is required. This is evidenced by observing from Equation 8 that as the input E is increased, the transfer function T decreases. The circuit of FIG. 4 is that of a linear feedback deflection amplifier if $R_V$ is infinite. However, if the value of $R_V$ is influenced in some form by the input E, attenuation can result and hopefully, the form of attenuation will produce a linearity correction factor such that $GT=K_2$.

From FIG. 4 the input E attenuated yields A $$A=\frac{R_2R_VE}{R_1R_2+R_1R_V+R_2R_V}$$

$$T'=\frac{A}{E}$$

$$T'=\frac{R_2}{(R_1+R_2)+\frac{R_1R_2}{R_V}} \tag{9}$$

Equation 9 yields an actual transfer function T' which at first glance does not appear in the desired form of Equation 8 for the ideal function T.

However, by a series of constant evaluations and reductions it is possible to show that Equation 9 may closely approximate the desired function if $R_V$ is varied in a particular fashion.

Evaluate the ratio $T/T'$ $$\frac{T'}{T}=\frac{\dfrac{K_2}{SK_1\sqrt{(2N^2-2N+1)-2(N-1)\sqrt{N^2-(K_2E/S)^2}}}}{\dfrac{R_2}{R_1R_2+\dfrac{R_1R_2}{R_V}}} \tag{10}$$

The constants may be evaluated by letting the ratio $$\frac{T}{T'}=1$$

at the initial point (where the deflection D and the input E are zero) and the final point (where deflection and input are maximum).

Initial point constant evaluation—If the input E is zero, no attenuation exists and the numerator of Equation 10 reduces to $K_2/SK_1$. In order for no attenuation to exist $R_V$ must be infinite in which case the denominator of Equation 10 reduces to $R_2/(R_1+R_2)$.

Since $T/T'$ is defined as ideal and equal to 1

$$\frac{K_2}{SK_1}=\frac{R_2}{R_1+R_2}$$

Note that the desired value of $R_V$ is infinite when E equals zero. Equation 10 may now be reduced by the above evaluation to:

$$\frac{T}{T'}=\frac{1+R_1R_2/R_V(R_1+R_2)}{\sqrt{2N^2-2N+1-2(N-1)\sqrt{N^2-(K_2E/S)^2}}} \quad (11)$$

Final point evaluation.—The value of E is placed at maximum and the final value of $R_V$ may be evaluated keeping in mind that $$\frac{T}{T'}=1$$

and $$K_2=\frac{D}{E}$$

all other values are either circuit or CRT constants.

$$R_{V(\mathrm{Min.})}=\frac{R_1R_2}{(R_1+R_2)\left[\sqrt{(2N^2-2N+1)-2(N-1)\sqrt{N^2-(K_2E/S)^2-1}}\right]} \quad (12)$$

Although the two procedures outlined above shed some light on the variable resistor $R_V$ only the start and end points have been evaluated.

If the attenuator is a variable resistor that varies as the inverse function of the control input then $$R_V=\frac{K_3}{f(E)}$$

Assuming $f(E)$ were known, the constant $K_3$ may be evaluated from Equation 12. Unfortunately $f(E)$ is at best a complicated function. Again, certain practical considerations prevail. It is possible to generate certain functions electronically, so by trial and error (by process of iteration) a search for the proper practical $f(E)$ may be conducted. The function $f(E)$ can be limited to linear, square law, cubic, fourth power and *n*th power curves, i.e. E, $E^2$, $E^3$, $E^4$ and $E^n$. The help of a digital computer was enlisted to help evaluate $f(E)$. By this method it is found that $f(E)=E^2$ is a very close approximation to the desired input control voltage function for the variable resistor attenuator which becomes $R_V$. Then $$R_V=\frac{K_3}{E^2} \quad (13)$$

where $E_2$ is the control input and $K_3$ may be evaluated by use of Equations 12 and 13.

The square law function $E^2$ as a control input to $R_V$ is very convenient. The entire analysis and synthesis of linearity correction is based upon a polar coordinate evaluation of deflection where only the radial distance components D is considered. The angle in the XY plane of deflection from the center has no effect upon distortion or correction. However, most display systems operate in Cartesian Coordinates where X and Y values are specified. To convert to the inputs in polar coordinates requires the solution of the equation $$E=\sqrt{X^2+Y^2}$$

The function required is $E^2=X^2+Y^2$. The latter function does not require finding the square root function and therefore it is much simpler.

Figure 5:
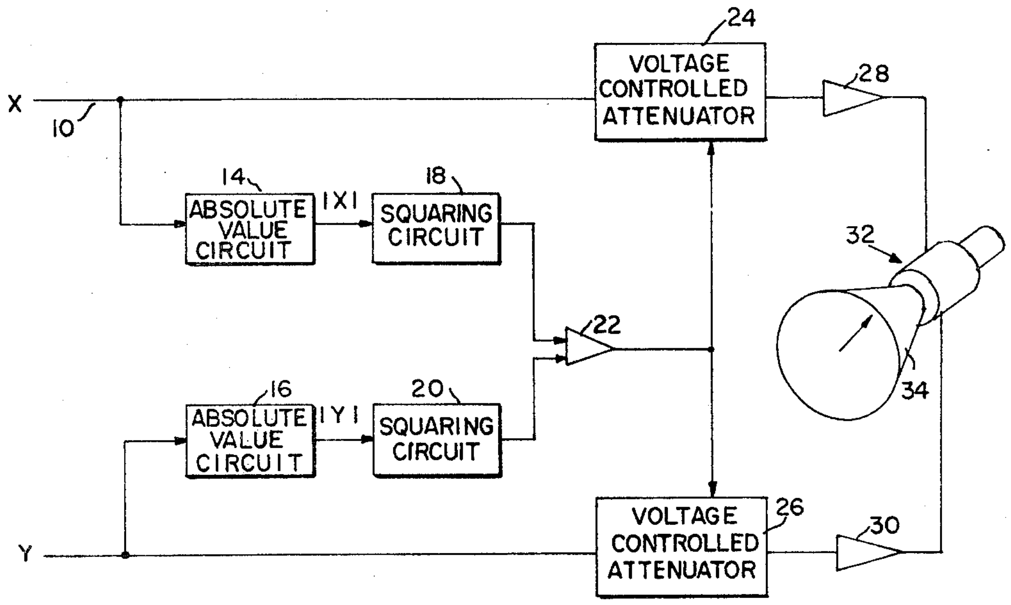
FIG. 5 is a block diagram of a CRT deflection system with linearity correction.

Referring now to FIG. 5, there is thereby illustrated a block diagram of the system for accomplishing linearity correction using a square law function $E^2$ as the control input.

The X and Y input voltages on lines 10 and 12 are applied to respective absolute value circuits 14 and 16 to obtain the magnitudes |X| and |Y|. These signals are then applied to respective squaring circuits 18 and 20 to obtain the signals $X^2$ and $Y^2$. The outputs from squaring circuits 18 and 20 are summed in a summing circuit 22 to provide the signal $E^2$. All the circuits previously mentioned are of conventional design and well known to those skilled in the art. The squaring circuits can, for example, comprise a dual JFET transistor and the summing circuit merely be a resistor at the drains thereof. The output of summing circuit 22 is applied as a control input to a pair of voltage controlled attenuators 24 and 26 which act to attenuate the signals X and Y which are applied thereto prior to being applied to a pair of deflection amplifiers 28 and 30 coupled to the yokes 32 and 34 of a CRT.

Several devices which can be used to act as a variable resistor are desirable as voltage controlled attenuators 24, 26.

One such preferred device is the metal oxide semiconductor field effect transistor (MOSFET). The MOSFET can act as a voltage variable resistor if the drain to source voltage is maintained below ±500 mv. and the control voltage $V_{GS}$ relationship to channel resistance is inversely proportional above the "ON" voltage threshold; that is, as the control voltage is increased the channel resistance decreases inversely. Therefore, if the threshold voltage is reflected as a constant component.

$$R_V=\frac{K_3}{f(E)}$$

where $f(E)=E^2$.

Figure 6:
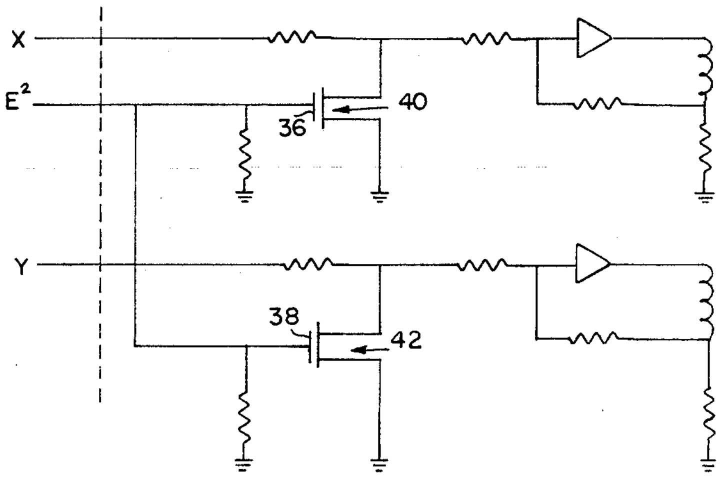
FIG. 6 is a schematic of a deflection amplifier employing a MOSFET voltage controlled attenuator.

Hence, a MOSFET may be used as the voltage controlled attenuators 24, 26 of FIG. 5. This is illustrated in FIG. 6.

The $E^2$ output of summing amplifier 22 is applied to gates 36, 38 of a pair of MOSFET's 40, 42, the MOSFET's taking the place of resistor $R_V$ in the linear feedback deflection amplifier of FIG. 4.

Figure 7:
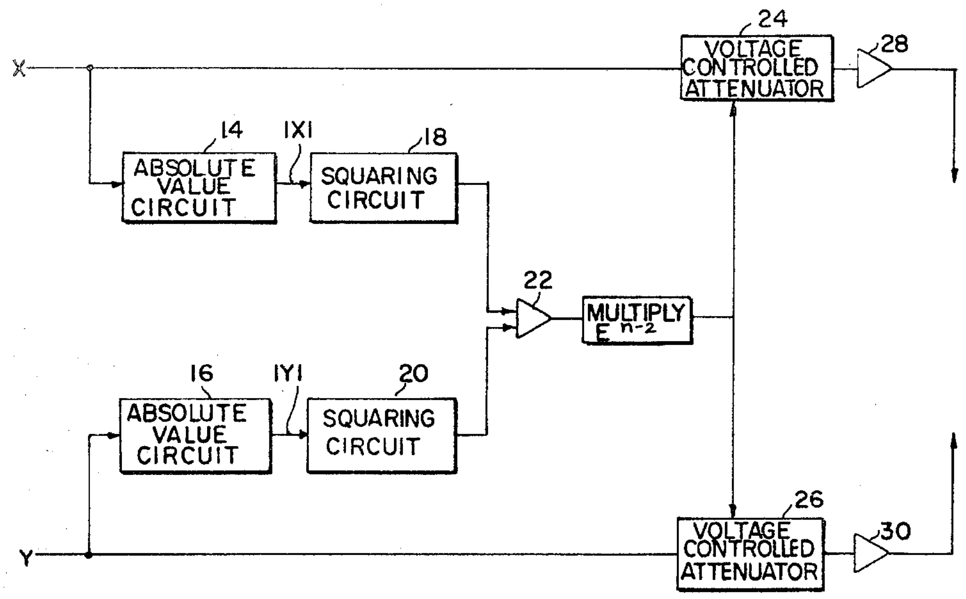
FIG. 7 is a block diagram of a CRT deflection system.

Other devices may also be used to provide correction, such as junction field effect transistors (JFET), light controlled resistors (if speed is not a factor), various photo optic devices, etc. However, these devices have $f(E)\neq E^2$ and, therefore, require more complex circuitry, the individual blocks being well known to those skilled in the art. The general block diagram for these devices is set forth in FIG. 7. This diagram is similar to that of FIG. 5, except that $E^2$ is multiplied by $E^{n-2}$ where $n$=the power to which E is to be raised. Alternatively the square root can be derived and that signal raised to the *n*th power.

While I have described above the principles of my invention in accordance with specific apparatus, it is to be clearly understood that the description is made only by way of example and not as a limitation of the scope of my invention as set forth in the accompanying claims.

I claim:

1. Apparatus for providing linearity correction to a magnetically deflected cathode ray tube having X (horizontal) and Y (vertical) deflection signals applied thereto, said linearity correction being applied to horizontal and vertical deflection amplifiers coupled to the horizontal and vertical deflection yokes of the cathode ray tube, said apparatus comprising:

means for generating a control signal $E^n$, where $E=\sqrt{X^2+Y^2}$ and $n$=any number;

first and second attenuating circuits for attenuating said X and Y deflection signals, respectively, each of said attenuating circuits having an output and only two signals outputs;

means coupling said X deflection signal to a first input of said first attenuating circuit;

means coupling said Y deflection signal to a first input of said second deflection circuitry; and means coupling said control signal to the second inputs of both said first and second attenuating circuits as a control input thereto.

2. Apparatus as defined in claim 1, wherein $n=2$, said means for generating a control signal including:

means for generating the sigals $|X|$ and $|Y|$;

means coupled to said means for generating $|X|$ and $|Y|$ for generating the signals $X^2$ and $Y^2$; and means for summing said $X^2$ and $Y^2$ signals to provide a signal $E^2$, where $E^2=X^2+Y^2$.

3. Apparatus as defined in claim 1, wherein said first and second attenuating circuits each includes a transistor.

4. Apparatus as defined in claim 3, wherein said transistors are field effect transistors with said $E^n$ signal being applied to the gate electrode thereof.

5. Apparatus as defined in claim 4 wherein $n=2$ and said transistors are MOSFET's.

6. Apparatus for providing linearity correction to a magnetically deflected cathode ray tube having X (horizontal) and Y (vertical) deflection signals applied thereto, said linearity correction being applied to horizontal and vertical deflection amplifiers coupled to the horizontal and vertical deflection yokes of the cathode ray tube, said apparatus comprising:

means for generating a control signal whose magnitude is proportional to the radial distance (D) from the center of the CRT screen to the spot defined by the X and Y deflection signals;

first and second correction circuits having said X and Y signals as inputs thereto, said correction circuits being coupled to said deflection amplifiers, each of said correction circuits having an output and only two signal inputs;

means coupling said X deflection signal to a first input of said first correction circuit;

means coupling said Y deflection signal to a first input of said second correction circuit; and means coupling said control signal to the second inputs of said first and second correction circuits.

7. Apparatus as defined in claim 6 wherein said control signal is $E^2$, where $E^2=X^2+Y^2$.

8. Apparatus for magnetically deflecting a cathode ray tube, comprising:

first and second input circuits for applying X (horizontal) and Y (vertical) input voltages;

first and second absolute value circuits for generating $|X|$ and $|Y|$ signals, said absolute value circuits being coupled to said first and second input circuits, respectively;

first and second squaring circuits coupled to said first and second absolute value circuits, respectively;

means for summing the outputs from said first and second squaring circuits;

first and second correction circuits, each having an output and only first and second signal inputs, for changing said X and Y signals being applied to said first inputs, respectively, proportional to the degree of correction desired, the output from said summing means being applied to the second inputs of each of said correction circuits; and means for applying said corrected X and Y signals to cathode ray tube.

9. Apparatus as defined in claim 8, wherein said correction circuits each includes a MOSFET transistor.

10. Apparatus as defined in claim 9, wherein said applying means includes first and second deflection amplifiers having as inputs thereto said X and Y signals with said MOSFET transistors coupled from said input to ground, said output from said summing circuit being applied to the gate electrode of said MOSFET as the control therefor.

References Cited

UNITED STATES PATENTS

| | | | |
|---|---|---|---|
| 2,831,145 | 4/1958 | Albert | 315—24 |
| 3,403,289 | 9/1968 | Garry | 315—24 |
| 3,422,305 | 1/1969 | Infante | 315—24 |
| 3,422,306 | 1/1969 | Gray | 315—27 |
| 3,308,334 | 3/1967 | Bryson | 315—24 |

RODNEY D. BENNETT, Jr., Primary Examiner

J. G. BAXTER, Assistant Examiner

U.S. Cl. X.R.

315—27